June 23, 1970   M. BENZ ET AL   3,516,295
V-BELT PULLEY
Filed Aug. 29, 1968
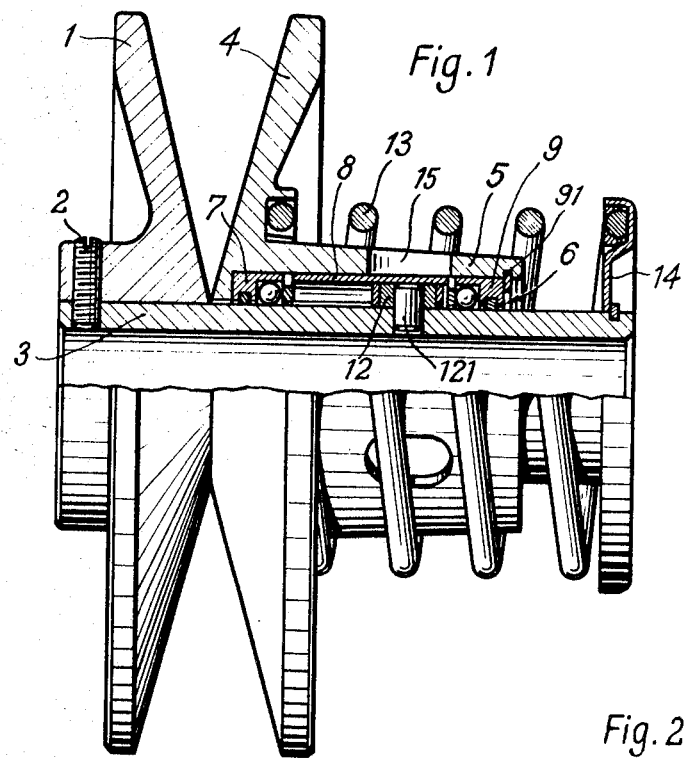
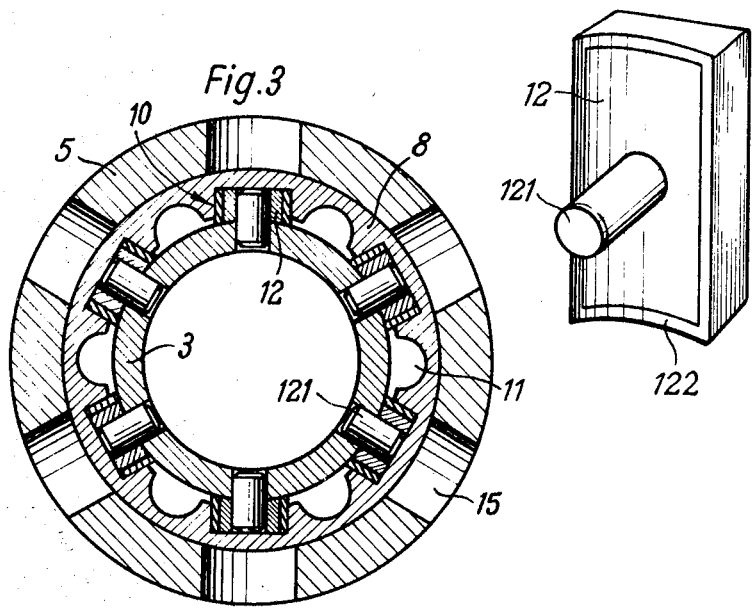
INVENTORS
MANFRED BENZ
ERNST KLEIN
BY Craig & Antonelli
ATTORNEYS

United States Patent Office 3,516,295
Patented June 23, 1970

3,516,295
V-BELT PULLEY
Manfred Benz, Gerlingen, Kreis Leonberg, and Ernst Klein, Ditzingen, Kreis Leonberg, Germany, assignors to Ernst Heinkel Aktiengesellschaft, Stuttgart-Zuffenhausen, Germany
Filed Aug. 29, 1968, Ser. No. 756,145
Claims priority, application Germany, Sept. 9, 1968, H 60,212
Int. Cl. F16h 55/56
U.S. Cl. 74—230.17       12 Claims

ABSTRACT OF THE DISCLOSURE

A V-belt pulley for a steplessly adjustable V-belt change-speed transmission which comprises a fixed V-belt pulley and an axially displaceable V-belt pulley whereby a drive bush arranged between two ball or roller bearings within the displaceable V-belt pulley is drivingly connected with the drive shaft by way of spline blocks and the drive bush acts simultaneously as spacer sleeve for the ball or roller bearings.

---

The present invention relates to a V-belt pulley, especially for a steplessly adjustable V-belt change-speed transmission with pair-wise fixed and axially displaceable V-belt pulleys. The present invention is concerned with the non-rotatable connection of the axially displaceable V-belt pulley with the drive shaft.

Such installations for a non-rotatable connection are known per se in the prior art. It is generally customary to connect the fixed V-belt pulley with the axially displaceable V-belt pulley by way of guide bolts which are fixedly secured at one V-belt pulley parallel to the axis thereof and extend displaceably through corresponding bores of the other V-belt pulley. In one type of prior art construction of this concept, a ring is pressed on the V-belt shaft parallel to the V-belt pulleys into which are inserted mounting bolts that engage in bores of the axially displaceable disk pulley. The last-described construction has the purpose of achieving an arrangement of the guide bolts which is as close to the axis as possible.

The entrainment or drive of the axially displaceable V-belt pulley by way of guide bolts offers the disadvantage that one is able to transmit only limited loads in this manner because, as a result of the shear-like stressing of the guide bolts, both the guide bolts themselves as also the guide bores, especially in the outer position of the V-belt pulley pairs are exposed to large loads which may readily give rise to deformations.

In order to avoid this disadvantage, coupling members in the form of wedges or splines have been arranged in proximity to the axis of the displaceable V-belt pulley which engage into corresponding grooves. However, also with this type of construction, deformations occur during the transmission of higher loads which may lead to operating troubles and failures.

All of the known prior art installations are subjected to the consequences of an increased wear during the transmission of higher loads. With all V-belt pulley transmissions of the aforementioned type of construction, the axially displaceable V-belt pulley moves to and fro during the transmission of forces because the V-belt which does not possess the same width in all cases as manufactured, is additionally continuously plastically deformed under the influence of the alternating tensions and stresses. The axial movements of the V-belt pulley resulting therefrom cause in due course of time a wear both at the guide bolts and at the guide bolt bores thereof as also at the walls of the spline grooves which may be so strong that the V-belt pulley can no longer be displaced at all in the axial direction some day for a change in the transmission ratio.

Known tests and experiments to install several splined connections uniformly about the circumference of the V-belt pulley shaft, only lead to a partial success because in this manner no uniform pressure distribution to the individual splines can be achieved. Rather, an individual spline will always transmit a large proportion of the load and will therefore always cause wear predominantly in the corresponding groove. If the spline groove system is once worn, then the entire V-belt pulley has to be exchanged. A further disadvantage resides in that the V-belt pulley which consists preferably of light-weight material, offers precisely at the groove walls correspondingly low resistance against wear. If, however, the grooves are machined into the drive shaft, then the drive shaft has to be exchanged which becomes quite costly and complicated.

The prior art types of constructions of splined connections are all machined directly in or at the V-belt pulley or at the V-belt pulley shaft. It is thereby difficult to adequately supply the splined connection with lubricating oil; one is, instead, content to introduce the lubricant once and for all during the assembly. As a result of the wear, this lubricant loses relatively quickly its lubricating effect.

A further problem with the known transmission elements resides in so limiting the freedom of movement of the axially displaceable V-belt pulley that the V-belt pulley does not become fixed in its limit position and then can be brought back only with difficulties. Solutions to this problem have also been proposed heretofore which, for example, propose to pivotally secure the guide bolt at the securing place or to provide separate locking means for the movement of the spline in front of the end of a groove passage.

The present invention has as its purpose to create an installation for the entrainment of the axially displaceable V-belt pulley in relation to the rotary movement of the V-belt pulley shaft by means of which, on the one hand, a safe transmission of also larger moments or torques is assured and, on the other, a simple boundary or limitation, safe against canting or tilting, of the displacement path is created. Finally, a sufficient supply with lubricant is to be assured. The aim and objects of the present invention are achieved in that the axially displaceable V-belt pulley is supported on an entrainment bush arranged between two ball or roller bearings which is non-rotatably connected with the drive shaft of the V-belt transmission by way of spline blocks whereby the spline blocks form between the ball or roller bearings a limitation of the axial displaceability of the V-belt pulley and the entrainment or drive bush simultaneously acts as spacer sleeve for the ball or roller bearings. In one preferred type of construction of the present invention, the entrainment or drive bush is provided with lubricating grooves.

These and further objects, features, and advantages of the present invention will become more obvious from the following description when taken in connection with the accompanying drawing which shows, for purposes of illustration only, one embodiment in accordance with the present invention, and wherein:

FIG. 1 is a schematic side elevational view, partly in cross section through the pair of V-belt pulleys of a V-belt change-speed transmission according to the present invention;

FIG. 2 is a perspective view of a spline block in accordance with the present invention; and FIG. 3 is a transverse cross-sectional view through the V-belt shaft, entrainment bush and V-belt pulley sleeve in accordance with the present invention.

Referring now to the drawing wherein like reference numerals are used throughout the various views to designate like parts, and more particularly to FIG. 1, the V-belt change-speed transmission illustrated therein is non-rotatably mounted on the engine shaft by means of a threaded pin 2 so as to rotate in unison therewith, and the fixed V-belt pulley 1 is conventionally pressed on the V-belt shaft 3. The axially displaceable V-belt pulley 4 includes a sleeve portion 5 whose axial boar 6 has a greater internal dimension than the diameter of the V-belt pulley shaft 3. Into this sleeve portion 5 a first bearing 7 is inserted, thereupon an entrainment or drive bush 8 and finally an end bearing 9.

The entrainment bush 8 is provided with axially extending spline passages 10 and lubricating grooves 11 (FIG. 3). The spline passages 10 accommodate the spline blocks 12 (FIG. 2) which are inserted with the pins 121 thereof into corresponding radial bores of the V-belt pulley shaft 3. The spline blocks 12 are coated or covered with a conventional synthetic resin 122 of any appropriate type. The axially displaceable V-belt pulley 4, which is connected in any conventional manner with the bush 8 to rotate in unison therewith, for example, by a threaded connection in a manner similar to the connection of fixed pulley 1 with the pulley shaft by means of threaded pin 2 or by bonding, cementing or gluing utilizing any appropriate material, is influenced by a spring 13 which is supported directly at the V-belt pulley 4 and at a spring disk 14 secured at the V-belt shaft 3.

The V-belt pulley 4 is assembled in the following manner:

At first, one assembles or mounts the V-belt pulley 4, 5 with its bearing 7 over the V-belt shaft 3. The spline blocks 12 are inserted into the spline passages 10 through an aperture 15 in the sleeve portion 5 whereby the pins 121 are inserted into the corresponding radial bores of the V-belt shaft 3. Thereupon, one introduces the bush 8 into the axial bore 6 of the V-belt pulley sleeve portion 5 and mounts thereafter the bearing 9 at the end of the bush 8 where it is retained by means of a snap ring 91. Finally, the spring disk 14 is mounted at the end of the V-belt shaft 3.

The arrangement descrbed in the illustrated embodiment offers the advantage of optimum small dimensions. Furthermore, the entrainment or drive bush 8 and the bearings 7 and 9 is completely sealed whereby an effective lubricaion is assured which is absent with all known prior art entrainment devices. The spline blocks run completely in lubricant. The entrainment bush 8 serves simultaneously as spacer sleeve between the bearings 7 and 9. The entire construction permits an optimum large support base whereby the designer has a free hand in relation to the determination of the shaft diameter.

While we have shown and described only one embodiment in accordance with the present invention, it is understood that the same is not limited thereto, but is susceptible of numerous changes and modifications as known to a person skilled in the art, and we therefore do not wish to be limited to the details shown and described herein, but intend to cover all such changes and modifications as are known to such persons skilled in the art.

We claim:
1. A V-belt pulley, in particular for a steplessly adjustable V-belt change-speed transmission, having a shaft and a pair of V-belt pulley sections one of said pair of pulley sections being fixed relative to said shaft and the other of said pair of pulley sections being axially displaceable relative to said fixed pulley section characterized in that said axially displaceable V-belt pulley section is supported on entrainment bush means, arranged between two anti-friction bearing means, spline block means non-rotatably connecting said entrainment bush means with said shaft, said entrainment bush means simultaneously serving as spacer sleeve for said anti-friction bearing means.

2. A V-belt pulley according to claim 1, wherein the entrainment bush means is provided with lubricating groove means.

3. A V-belt pulley according to claim 2, wherein said shaft is provided with radial bores, said spline block means having pin portions for engagement in said bores.

4. A V-belt pulley according to claim 3, wherein said spline block means include a head portion of a shape complementary to axial spline grooves provided in said bush means to enable relative axial movement between said bush means and said shaft.

5. A V-belt pulley according to claim 4, wherein said lubricating groove means are in communication with said spline grooves.

6. A V-belt pulley according to claim 5, further comprising aperture means in a sleeve portion of said axially displaceable V-belt pulley section to enable assembly therethrough of said spline block means.

7. A V-belt pulley according to claim 6, further comprising spring means operatively connecting said shaft with said axially displaceable V-belt pulley section.

8. A V-belt pulley according to claim 1, wherein said shaft is provided with radial bores, said spline block means having pin portions for engagement in said bores.

9. A V-belt pulley according to claim 8, wherein said spline block means include a head portion of a shape complementary to axial spline grooves provided in said bush means to enable relative axial movement between said bush means and said shaft.

10. A V-belt pulley according to claim 9, further comprising aperture means in a sleeve portion of said axially displaceable V-belt pulley section to enable assembly therethrough of said spline block means.

11. A V-belt pulley according to claim 1, further comprising spring means operatively connecting said shaft with said axially displaceable V-belt pulley section.

12. A V-belt pulley according to claim 1, further comprising aperture means in a sleeve portion of said axially displaceable V-belt pulley section to enable assembly therethrough of said spline block means.

References Cited

UNITED STATES PATENTS

| | | | |
|---|---|---|---|
| 3,358,520 | 12/1967 | Heydlauf et al. | 74—230.17 |
| 3,400,600 | 9/1968 | Ruprecht et al. | 74—230.17 |

JAMES A. WONG, Primary Examiner